United States Patent
Kitamura et al.

(10) Patent No.: US 7,414,339 B2
(45) Date of Patent: Aug. 19, 2008

(54) VEHICULAR ROTATING ELECTRICAL MACHINE APPARATUS

(75) Inventors: Yutaka Kitamura, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/555,090

(22) PCT Filed: Mar. 3, 2005

(86) PCT No.: PCT/JP2005/003622
§ 371 (c)(1),
(2), (4) Date: Nov. 2, 2005

(87) PCT Pub. No.: WO2005/086322
PCT Pub. Date: Sep. 15, 2005

(65) Prior Publication Data
US 2007/0035270 A1 Feb. 15, 2007

(30) Foreign Application Priority Data
Mar. 3, 2004 (JP) .............................. 2004-059547

(51) Int. Cl.
*H02P 1/24* (2006.01)
(52) U.S. Cl. .......................... 310/68 D; 310/89; 310/58
(58) Field of Classification Search ............... 310/68 D, 310/58
See application file for complete search history.

(56) References Cited
U.S. PATENT DOCUMENTS

| | | | | |
|---|---|---|---|---|
| 2,571,284 A * | 10/1951 | Nims | ........................... | 290/17 |
| 4,604,538 A * | 8/1986 | Merrill et al. | ............. | 310/68 D |
| 5,331,239 A * | 7/1994 | Kwun et al. | .............. | 310/68 R |
| 5,491,370 A * | 2/1996 | Schneider et al. | ............. | 310/54 |
| 5,517,401 A * | 5/1996 | Kinoshita et al. | ............. | 363/98 |
| 5,682,070 A * | 10/1997 | Adachi et al. | ................. | 310/71 |
| 5,731,689 A * | 3/1998 | Sato | ........................... | 322/25 |
| 5,742,498 A | 4/1998 | Taniguchi et al. | | |

(Continued)

FOREIGN PATENT DOCUMENTS
JP 2-266854 A 10/1990

(Continued)

*Primary Examiner*—Darren Schuberg
*Assistant Examiner*—Naishadh N Desai
(74) *Attorney, Agent, or Firm*—Sughrue Mion, PLLC

(57) ABSTRACT

[Problem] In a vehicular rotating electrical machine apparatus mounted in an electric vehicle or a hybrid electric vehicle, a rotating electrical machine apparatus in which a rotating electrical machine and an inverter unit to control the rotating electrical machine are integrated is miniaturized, and its torque characteristic and efficiency are improved.

[Means for Resolution] Since an inverter unit 4 is cooled by cooling air forcibly formed by a cooling fan 28, the inverter unit 4 is efficiently cooled. Then, heat radiating fins 401*a*, 402*a* and 403*a* of heat sinks 401, 402 and 403 can be miniaturized, and consequently, the inverter unit 4 is miniaturized, and mountability of the inverter unit 4 to a rear bracket 19 is improved. Further, since the inverter unit 4 and a rotating electrical machine 2 are cooled by the cooling air formed by the cooling fan 28, the cooling medium of the inverter unit 4 is used also as the cooling medium (cooling air) of the rotating electrical machine 2, and a cooling structure is simplified.

11 Claims, 11 Drawing Sheets

U.S. PATENT DOCUMENTS

| | | | | |
|---|---|---|---|---|
| 5,780,953 A | * | 7/1998 | Umeda et al. | 310/263 |
| 5,793,144 A | * | 8/1998 | Kusase et al. | 310/263 |
| 5,833,022 A | * | 11/1998 | Welke | 180/65.2 |
| 5,993,350 A | * | 11/1999 | Lawrie et al. | 477/5 |
| 6,198,188 B1 | * | 3/2001 | Ihata | 310/68 D |
| 6,538,352 B2 | * | 3/2003 | Asao | 310/68 D |
| 6,867,517 B2 | * | 3/2005 | Kumagai | 310/68 D |
| 6,930,417 B2 | * | 8/2005 | Kaneko et al. | 310/58 |
| 7,030,526 B2 | * | 4/2006 | Tsukamoto et al. | 310/90 |
| 7,122,923 B2 | * | 10/2006 | Lafontaine et al. | 310/58 |
| 2007/0035185 A1 | * | 2/2007 | Asao et al. | 310/58 |

FOREIGN PATENT DOCUMENTS

| | | |
|---|---|---|
| JP | 8-331818 A | 12/1996 |
| JP | 9-252563 A | 9/1997 |
| JP | 10-257718 A | 9/1998 |
| JP | 11-27903 A | 1/1999 |
| JP | 11-180162 A | 7/1999 |
| JP | 11-206183 A | 7/1999 |
| JP | 2004-274992 A | 9/2004 |
| JP | 2004-312852 A | 11/2004 |
| JP | 2005-117708 | 4/2005 |

* cited by examiner

VEHICULAR ROTATING ELECTRICAL MACHINE APPARATUS

TECHNICAL FIELD

The present invention relates to a vehicular rotating electrical machine apparatus mounted in an electric vehicle, a hybrid electric vehicle or the like, and particularly to a vehicular rotating electrical machine apparatus in which a rotating electrical machine and an inverter unit to control the rotating electrical machine are integrated.

BACKGROUND ART

In recent years, against the background of prevention of global warming, emission reduction of CO2 has been demanded. The reduction of CO2 in an automobile means an improvement in fuel consumption performance, and as one of the solutions, the development and commercial application of an electric vehicle (EV) or a hybrid electric vehicle (HEV) has been pursued.

Especially, functions requested for a rotating electrical machine mounted in a hybrid electric vehicle include idling stop at the time of vehicle stop, energy regeneration during deceleration running, torque assist during acceleration running, and the like, and the fuel consumption performance can be improved by realizing these.

As the rotating electrical machine for this, a motor generator is transversely mounted at the outside of an engine, a belt is stretched between the motor generator and a crank shaft pulley, and bidirectional driving force transmission is performed between the motor generator and the engine.

At the time of electric operation, DC power of a battery is converted into AC power by an inverter. This AC power is supplied to the motor generator, and the motor generator is rotation driven. This rotation force is transmitted to the engine through the belt, and the engine is started. On the other hand, at the time of electric power generation, part of the driving force of the engine is transmitted to the motor generator through the belt, AC power is generated, and this AC power is converted into DC power by the inverter and is stored in the battery (see, for example, patent document 1).

Patent document 1: JP-A-2001-95103 (FIG. 1, FIG. 2)

DISCLOSURE OF THE INVENTION

Problems that the Invention is to Solve

In a conventional vehicular rotating electrical machine apparatus, since an inverter is disposed at a long distance from a motor generator, the wiring length of an AC wiring to electrically connect the inverter and the motor generator becomes long. As a result, since the wiring resistance of the AC wiring becomes large, and a voltage drop in the AC wiring becomes large, and accordingly, there has been a problem that such a situation occurs that electric power to cause the motor generator to output a desired torque can not be supplied, or the rotation of the motor generator can not be raised up to a desired rotation speed.

Besides, in order to suppress the voltage drop in the AC wiring, it is conceivable to increase the thickness of the AC wiring to decrease the wiring resistance. However, in this case, there has been a problem that the wiring weight and wiring cost are significantly increased.

Further, it has been very difficult to secure a space for new addition and mounting of the inverter and its control device in an engine room, and there has been a problem that it is necessary to significantly miniaturize the inverter and its control device.

This invention has been made to solve the above problems, and particularly, in a vehicular rotating electrical machine apparatus in which an inverter unit is integrated, the vehicular rotating electrical machine apparatus is provided in which a rotating electrical machine including the inverter unit can be miniaturized and its torque characteristic and efficiency can be improved.

Means for Solving the Problems

A vehicular rotating electrical machine apparatus of the invention includes a rotating electrical machine including a shaft rotatably supported by a pair of brackets having a suction hole at an end face and an exhaust hole at an outer periphery, a rotor disposed in the pair of bracket, fixed to the shaft, having a field winding mounted to its inside, and having cooling fans mounted to both ends, and an armature fixed to the pair of brackets at an outer periphery of the rotor to surround the rotor and including an armature iron core on which an armature winding is wound, and an inverter unit which converts DC power of a battery into AC power, supplies the AC power to the armature winding and causes the rotor to generate rotating power, or converts AC power generated in the armature winding into DC power and charges the battery, in which the inverter unit has a substantially hollow cylindrical shape or hollow polygonal prism shape, includes a heat sink having many heat radiating fins at least part of an outer surface, and is disposed at an anti-load side end of the rotating electrical machine to surround the shaft and to cause cooling air by the cooling fan to cool the heat radiating fins before it cools the rotating electrical machine.

ADVANTAGE OF THE INVENTION

According to the invention, the inverter unit is integrally fixed to the anti-load side end of the rotating electrical machine, and the heat radiating fins of the inverter unit are forcibly cooled before the cooling air by the cooling fans cools the rotating electrical machine, so that the heat sink of the inverter unit is effectively cooled, and the inverter unit itself can be miniaturized. As a result, great space-saving is obtained by the combination of the rotating electrical machine and the inverter unit, and mount ability in an engine room becomes excellent, and further, since the inverter unit is integrally fixed to the rotating electrical machine, AC wiring to connect the inverter unit and the rotating electrical machine can be reduced, voltage drop in the AC wiring is suppressed, the torque characteristic of the rotating electrical machine can be greatly improved, and great reduction in weight and in cost due to the reduction of the AC wiring can be realized.

BEST MODE FOR CARRYING OUT THE INVENTION

Embodiment 1

FIG. 1 is a longitudinal sectional view showing a structure in which an inverter unit and a rotating electrical machine are integrated in a vehicular rotating electrical machine apparatus of embodiment 1 of the invention, FIG. 2 is a view of the inverter unit, when viewed from a rear side, in a case where a cover is removed in FIG. 1, and FIG. 3 is a conceptual view of a system circuit in a hybrid electric vehicle in which the vehicular rotating electrical machine apparatus of embodiment 1 of the invention is mounted. Incidentally, line A-A of FIG. 2 indicates a cutting-plane line corresponding to the longitudinal sectional view of FIG. 1.

In FIG. 3, a rotating electrical machine 2 is a winding field synchronous motor generator, and includes an armature winding 24 of an armature (not shown) and a field winding 21 of a rotor (not shown).

Besides, an inverter unit 4 in this case of the drawing includes an inverter module 40 having plural switching elements 41 and diodes 42 respectively connected in parallel to the switching elements 41, and a capacitor 43 connected in parallel to the inverter module 40. The inverter module 40 is constructed such that a pair includes the switching element 41 and the diode 42 connected in parallel to each other, two such pairs are connected in series to each other to form a set, and three such sets are arranged in parallel to each other. Each of ends of the Y connection (star connection) of the armature winding 24 is electrically connected through an AC wiring 9 (incidentally, this is eliminated in embodiment 1) to a middle point between the switching elements 41 connected in series to each other. Besides, a positive electrode side terminal and a negative electrode side terminal of a battery 5 are respectively electrically connected to a positive electrode side and a negative electrode side of the inverter module 40 through a series wiring 8.

In the inverter module 40, the switching operation of the switch element 41 is controlled by a control device 44. The control device 44 controls a field current control device 45 and adjusts field current flowing to the field winding 21.

In FIG. 1, a shaft 16 is axially supported through bearings 10 and 11, and the rotating electrical machine 2 is rotatably disposed in a case including a front bracket 18 and a rear bracket 19, and includes a rotor 20 having rotor iron cores 20A and 20B and a field winding 21, and an armature 22 in which radial-direction ends of an armature iron core 23 at both ends thereof in the axial direction are held by the front bracket 18 and the rear bracket 19 and which is disposed so as to surround the rotor 20. The front bracket 18 and the rear bracket 19 are fastened and integrated by a through bolt 25. A rotating electrical machine pulley 12 is fixed to an extension end of the shaft 16 of the rotor 20 extending from the front bracket 18. Cooling fans 28 are respectively fixed to both end faces of the rotor 20 in the axial direction. A pair of slip rings 29 are mounted to the rear side of the shaft 16. Further, a brush holder 30 is disposed at the outer wall surface of the rear bracket 19 so as to be positioned at the rear side outer periphery of the shaft 16, and a pair of brushes 31 are disposed in the brush holder 30 so as to come in slide contact with the slip rings 29. Besides, suction holes 18a and 19a are provided in the end faces of the front bracket 18 and the rear bracket 19, and exhaust holes 18b and 19b are provided in the outer peripheral surfaces of the front bracket 18 and the rear bracket 19.

The inverter unit 4 has a substantially hollow cylindrical shape or polygonal prism shape formed by cutting away only a portion of the brush holder 30 so as to surround the slip rings 29, and includes a circuit board 4a made by covering a circuit terminal for connection from the outside to the inside with insulating resin, an inner peripheral surface side heat sink 401 integrally fixed to the circuit board 4a, an anti-rear bracket side heat sink 402, and an outer peripheral surface side heat sink 403. As raw material of each of the heat sinks 401, 402 and 403, high heat conduction metal such as, for example, copper or aluminum is used, and as shown in FIG. 2, heat radiating fins 401a, 402a, 403a are respectively provided to stand radially toward substantially the center direction.

A circuit board 404 is disposed on an anti-heat radiating fin side surface of the heat sink 402 in an electric insulation state and is housed in the inverter unit 4. The switching elements 41, the diodes 42, and the capacitor 43 are mounted on the circuit board 404 to constitute the circuit shown in FIG. 3. The inverter unit 4 constructed as stated above is directly attached to the end face of the rear bracket 19 so as to surround the shaft 16. Lead lines 201, 202 and 203 extending from ends of the Y connection of the armature winding 24 extend from the rear bracket 19 through an insulation bush 300, and are electrically directly connected to connection terminals part 420 of the circuit board 4a of the inverter unit 4. Further, the battery 5 is electrically connected to power source terminals (not shown) of the inverter unit 4 through the DC wiring 8. A cover 50 is mounted so as to surround the inverter unit 4 disposed on the outer end face of the rear bracket 19 and the brush holder 30, and a suction hole 50a is provided in the surface of this cover 50 opposite to the heat radiating fin 402a.

Next, the operation of the rotating electrical machine apparatus of embodiment 1 constructed as stated above at the time of idling stop in a hybrid electric vehicle will be described.

First, when a condition for the start of idling stop is established, the engine (not shown) is stopped. When a condition for the restart of the engine is established, DC power is fed to the inverter unit 4 through the DC wiring 8 from the battery 5. The control device 44 ON/OFF controls the respective switching elements 41 of the inverter module 40, and the DC power is converted into three-phase AC power. The three-phase AC power is supplied to the armature winding 24 of the rotating electrical machine 2 through the lead wires 201, 202 and 203 extending from the armature winding 24. By this, rotating magnetic field is applied to the surrounding of the field winding 21 of the rotor 20 to which the field current is supplied by the field current control device 45, and the rotor is rotation driven.

The rotation driving force of the rotor 20 is transmitted to the engine through the pulley 12 for the rotating electrical machine, a belt (not shown), and a crank pulley (not shown), and the engine is started.

When the engine is started, the rotation driving force of the engine is transmitted to the rotating electrical machine 2 through the crank pulley, the belt, and the pulley 12 for the rotating electrical machine. By this, the rotor is rotation driven, and three-phase AC voltage is induced in the armature winding 24. Then, the control device 44 ON/OFF controls the respective switching elements 41, converts the three-phase AC power induced in the armature winding 24 into DC power, and charges the battery 5.

In such a series of idle stop operations as stated above, the rotor 20 to both end faces of which the cooling fans 28 are fixed is rotated, so that the inverter unit 4 directly attached to the anti-load side (anti-pulley side) end of the rotating electrical machine 2 is cooled.

When the rotor 20 is rotation driven and the cooling fans 28 are rotation driven, as indicated by arrows in FIG. 1, cooling air is sucked through the suction hole 50a of the cover 50 and flows from the heat radiating fin 402a to the heat radiating fin 401a, and flows from the heat radiating fin 402a along the heat radiating fin 403a, and the heat generated by the switching elements 41, the diodes 42 and the capacitor 43 is radiated to the cooling air through the heat radiating fins 402a, 401a and 403a. The cooling air is introduced into the suction hole 19a provided in the rear bracket 19, is bent by the cooling fan 28 in the centrifugal direction, and is discharged through the exhaust hole 19b, and the flow of the cooling air is formed. The armature winding 24 is cooled by the cooling air bent in the centrifugal direction by the cooling fan 28.

Accordingly, in embodiment 1, since the inverter unit 4 is constructed such that the heat radiating fins 401a, 402a, 403a of the inverter unit 4 are first cooled by the cooling air forcibly formed by the cooling fan 28, heat generated from the switching elements 41 and the like in the inside of the inverter unit 4 can be efficiently radiated to the outside without being hardly influenced by heat generated from the armature 22 of the rotating electrical machine 2, and the inverter unit 4 is efficiently cooled. Then, the heat radiating fins 401a, 402a, 403a of the heat sink 401, 402 and 403 can be miniaturized, and as a result, the miniaturization of the inverter unit 4 is realized, and the mount ability of the inverter unit 4 to the rear bracket 19 is improved. Further, since the inverter unit 4 and the rotating electrical machine 2 are cooled by the cooling air formed by the cooling fan 28, the cooling medium of the inverter unit 4 is used also as the cooling medium (cooling air) of the rotating electrical machine 2, and the cooling structure is simplified.

Since the inverter unit 4 is directly attached to the outside end face of the rear bracket 19 of the rotating electrical machine 2, and the lead wires 201, 202 and 203 of the armature winding 24 are directly electrically connected to the inverter unit 4, resistance is not increased by AC wiring between the inverter unit and the armature winding 24. By this, voltage drop between the inverter unit 4 and the armature winding 24 is minimized, and the torque characteristic of the rotating electrical machine 2 can be greatly improved.

Besides, since the inverter unit 4 is directly attached to the rotating electrical machine 2, the attachment space can be reduced, and the layout property is improved.

Besides, since the AC wiring from the inverter unit 4 to the rotating electrical machine 2 can be reduced, reduction in weight and in cost can be realized. Besides, market troubles such as erroneous wiring of the AC wiring can be prevented.

Further, the switching element having large heat generation quantity and the capacitor having relatively large heat generation quantity can be efficiently cooled by the heat radiating fins of the inverter unit.

Embodiment 2

FIG. 4 is a longitudinal sectional view showing a structure in which an inverter unit and a rotating electrical machine are integrated in a vehicular rotating electrical machine apparatus of embodiment 2 of the invention, and FIG. 5 is a view showing heat radiating fins of the inverter unit when viewed from a rear bracket side.

In FIG. 4, an inverter unit 4 has a substantially cylindrical shape or polygonal prism shape formed by cutting away only a portion of a brush holder 30 so as to surround a slip ring 29, and its outer appearance includes a lid-shaped case 4b made by covering a circuit terminal for connection from the outside to the inside with insulating resin, and a heat sink 410 integrally fixed to the case 4b. As raw material of the heat sink 410, high heat conduction metal such as, for example, copper or aluminum is used, and as shown in FIG. 5, outer peripheral surface side fins 410a at the outer peripheral surface side of the heat sink 410, and rear bracket side heat radiating fins 410b at the rear bracket side are disposed to be substantially in parallel to a shaft 16 and to be expanded radially from the center direction.

A circuit board 404 is disposed on the anti-rear bracket side fin surface of the heat sink 410 in an electric insulation state and is housed in the inverter unit 4. Switching elements 41, diodes 42 and a capacitor 43 are mounted on the circuit board 404 so as to constitute a circuit as shown in FIG. 3. Besides, similarly, a circuit board 405 is also disposed on the heat sink 410 in an electric insulation state and is housed in the inverter unit 4. A control device 44 and a field current control device 45 are mounted on the circuit board 405 so as to constitute a circuit as shown in FIG. 3.

The inverter unit 4 constructed as stated above is directly attached to the outside end face of a rear bracket 19, and lead wires 201, 202 and 203 extending from ends of the Y connection of an armature winding 24 extend from the rear bracket 19 through an insulating bush 300 and are electrically connected to connection terminal parts 420 of the case 4b of the inverter unit 4.

A cover 50 is mounted so as to surround the inverter unit 4 disposed at the outer end face of the rear bracket 19 and the brush holder 30, and a suction hole 50b opposite to the outer peripheral surface side heat radiating fin 410a is provided in the outer peripheral surface of the cover 50. At the opening side end of the cover 50, a partition wall 50c to prevent high temperature cooling air exhausted through an exhaust hole 19b of the rear bracket 19 from circulating to the suction hole 50b side of the cover 50 is provided on the outside periphery of the exhaust hole 19b.

Incidentally, the other structure is similar to embodiment 1.

In this embodiment 2, when the rotor 20 is rotation driven and the cooling fans 28 is rotation driven, as indicated by arrows in FIG. 4, the cooling air is sucked through the suction hole 50b of the cover 50, and as shown in FIG. 5, flows along the outer peripheral surface side heat radiating fin 410a and the rear bracket side heat radiating fin 410b, and the heat generated by the switching elements 41, the diodes 42, the capacitor 43, the control device 44 and the field current control device 45 is radiated to the cooling air through the heat radiating fins 410a and 410b. Then, the cooling air is introduced into the suction hole 19a provided in the rear bracket 19, is bent in the centrifugal direction by the cooling fan 28, is exhausted from the exhaust hole 19b, and the flow of the cooling air is formed. Incidentally, the exhaust direction of the cooling air discharged through the exhaust hole 19b is controlled by the partition wall 50c provided at the opening side end of the cover 50 so that it is not circulated toward the direction of the suction hole 50b of the cover 50. The armature winding 24 is cooled by the cooling air bent in the centrifugal direction by the cooling fan 28. Incidentally, the partition wall 50c may be an air-guide wall to control the exhaust direction of the cooling air.

Accordingly, in this embodiment 2, since the inverter unit 4 is cooled by the cooling air forcibly formed by the cooling fan 28, the inverter unit 4 is efficiently cooled. Then, the heat sink 410, and the heat radiating fins 410a and 410b can be miniaturized, the inverter unit 4 is miniaturized, and the mount ability of the inverter unit 4 to the rear bracket 19 is improved. Further, since the inverter unit 4 and the rotating electrical machine 2 are cooled by the cooling air formed by the cooling fan 28, the cooling medium of the inverter unit 4 is used also as the cooling medium (cooling air) of the rotating electrical machine 2, and the cooling structure is simplified.

Since the inverter unit 4 is directly attached to the outside end face of the rear bracket 19 of the rotating electrical machine 2, and the lead wires 201, 202 and 203 of the armature winding 24 are directly electrically connected to the inverter unit 4, resistance is not increased by AC wiring between the inverter unit and the armature winding 24. By this, voltage drop between the inverter unit 4 and the armature winding 24 is minimized, and the torque characteristic of the rotating electrical machine 2 can be greatly improved.

Besides, since the inverter unit 4 is directly attached to the rotating electrical machine 2, the attachment space can be reduced, and the layout property is improved.

Besides, since the heat radiating fins 410a and 410b are disposed along the direction in which the cooling air sucked through the suction hole 50b flows, the heat radiating fins are efficiently cooled, and further, since ventilation resistance does not become large, the quantity of cooling air does not decrease, and accordingly, there is an effect that the whole cooling efficiency does not become less efficient.

Besides, since the high temperature exhaust cooling air discharged from the exhaust hole 19b is not circulated to and sucked through the suction hole 50b of the cover 50, the low temperature cooling air is always sucked through the suction hole 50b, and the inverter unit 4 can be efficiently cooled.

Further, since the inverter unit 4 is covered by the metal cover, there is an effect that noise generated from the inverter unit 4 and its connection and the like is not emitted to the outside, and inversely, there is an effect that an erroneous operation of the inverter unit 4 due to noise from the outside can be avoided.

Embodiment 3

FIG. 6 is a longitudinal sectional view showing a structure in which an inverter unit and a rotating electrical machine are integrated in a vehicular rotating electrical machine apparatus of embodiment 3 of the invention.

In FIG. 6, an inverter unit 4 has a substantially hollow cylindrical shape or polygonal prism shape formed by cutting away only a portion of a brush holder 30 so as to surround a slip ring 29, and its outer appearance includes a circuit board 4a made by covering a circuit terminal for connection from the outside to the inside with insulating resin, an inner peripheral surface side heat sink 401 integrally fixed to the circuit board 4a, a rear bracket end face side heat sink 402, and an outer peripheral surface side heat sink 403. As raw material of each of the heat sinks 401, 402 and 403, high conduction metal such as, for example, copper or aluminum is used, and heat radiating fins 401a, 402a and 403a are provided to stand on the outside surface.

A circuit board 404 is disposed on the anti-heat radiating fin surface of the heat sink 402 in an insulation state and is housed in the inverter unit 4. Switching elements 41, diodes 42 and a capacitor 43 are mounted on the circuit board 404 so as to constitute a circuit as shown in FIG. 3.

The inverter unit 4 constructed as stated above is directly attached to the inside end face of a rear bracket 19, and lead wires 201, 202 and 203 extending from ends of the Y connection of an armature winding 24 are electrically connected to connection terminal parts 420 of the circuit board 4a of the inverter unit 4.

A donut-shaped partition plate 406 in which a ventilation hole 406a is provided at the center part is integrally fixed on the circuit board 4a of the inverter unit 4, and is constructed such that a rotor 20 and an armature 22 are partitioned, and high temperature cooling air in the vicinity of the armature winding 24 is not circulated to the inverter unit side.

Incidentally, the other structure is constructed similarly to embodiment 1.

In this embodiment 3, when the rotor 20 is rotation driven and cooling fans 28 are rotation driven, as indicated by arrows in FIG. 6, cooling air is sucked through a suction hole 19a of the rear bracket 19 end face, flows from the heat radiating fin 402a to the heat radiating fin 401a, and from the heat radiating fin 402a along the heat radiating fin 403a, and the heat generated by the switching elements 41, the diodes 42 and the capacitor 43 is radiated to the cooling air through the heat radiating fins 402a, 401a and 403a.

The cooling air is introduced to the ventilation hole 406a provided at the center of the partition plate 406, is bent in the centrifugal direction by the cooling fan 28, and is discharged from an exhaust hole 19b, and the flow of the cooling air is formed. The armature winding 24 is cooled by the cooling air bent in the centrifugal direction by the cooling fan 28.

Accordingly, in this embodiment 3, since the inverter unit 4 is cooled by the cooling air forcibly formed by the cooling fan 28, the inverter unit 4 is efficiently cooled. Then, the heat radiating fins 401a, 402a and 403a of the heat sinks 401, 402 and 403 can be miniaturized, and consequently, the inverter unit 4 is miniaturized, and the mount ability of the inverter unit 4 to the rear bracket 19 is improved. Further, since the inverter unit 4 and the rotating electrical machine 2 are cooled by the cooling air formed by the cooling fan 28, the cooling medium of the inverter unit 4 is used also as the cooling medium (cooling air) of the rotating electrical machine 2, and the cooling structure is simplified.

Since the inverter unit 4 is directly attached to the inside end face of the rear bracket 19 of the rotating electrical machine 2, and the lead wires 201, 202 and 203 of the armature winding 24 are directly electrically connected to the inverter unit 4, resistance is not increased by AC wiring between the inverter unit and the armature winding 24. By this, voltage drop between the inverter unit 4 and the armature winding 24 is minimized, and the torque characteristic of the rotating electrical machine 2 can be greatly improved.

Besides, since the inverter unit 4 is directly attached to the rotating electrical machine 2, the attachment space can be reduced, and the layout property is improved.

Besides, since the partition plate 406 is fixed integrally with the inverter unit 4, the mount ability of the partition plate 406 is improved.

Embodiment 4

FIG. 7 is a longitudinal sectional view showing another structure of an inverter unit in a vehicular rotating electrical machine apparatus of embodiment 4 of the invention.

Embodiment 4 is different from embodiment 2 especially in the structure of the inverter unit, and portions denoted by the same reference numerals are constructed similarly to embodiment 2.

In FIG. 7, the outer appearance of an inverter unit 4 includes a circuit board 4a made by covering a circuit terminal for connection from the outside to the inside with insulating resin, a lid-shaped case 4b similarly made of insulating resin, a heat sink 411 sandwiched between the case 4b and the circuit board 4a and integrally fixed, and a heat sink 410 which is fixed to the other surface of the circuit board 4a and on which an outer peripheral surface side fin 410a and a rear bracket side fin 410b are provided to stand. A circuit board 404 is disposed on the anti-rear bracket side fin surface of the heat sink 410 in an insulation state and is housed in the inverter unit 4. Switching elements 41, diodes 42 and a capacitor 43 are mounted on the circuit board 404 so as to constitute a circuit as shown in FIG. 3. Similarly, a circuit board 405 is also disposed on the heat sink 411 in an electric insulation state and is housed in the inverter unit 4. A control device 44 and a field current control device 45 are mounted on this circuit board 405 so as to constitute a circuit as shown in FIG. 3. The circuit board 4a functions as a relay terminal for connecting the switching element 41 on the circuit board 404 and the control device 44 on the circuit board 405. As stated above, embodiment 4 has such a structure that the circuit board 404 in which the switching elements 41, the diodes 42 and the capacitor 43 are mounted on the heat sink 410, and the circuit board 405 in which the control device 44 and the field current control device 45 are mounted on the heat sink 411 are stacked in the axial direction to form multiple stages.

As described above, the switching elements 41, the diodes 42 and the capacitor 43 each having relatively large heat generation quantity and requiring sufficient cooling are mounted to the heat sink 410 on which the large heat radiating fins 410a and 410b are provided to stand, and the control device 44 and the field current control device 45 each having relatively small heat generation quantity are mounted to the heat sink 411, and accordingly, the electric part requiring sufficient cooling can be efficiently cooled, and further, since the circuit board 4a prevents the respective heat sinks from being mutually thermally influenced, there is an effect that a drop in quality and reliability due to the difference of heat resistance is prevented.

Besides, since the switching element 41 and the control device 44 for controlling the switching operation of the switching element are constructed in the same inverter unit 4, both can be directly connected to each other in the inverter unit 4, and there is an effect that a structure of a specific connection part for connecting the switching element 41 and the control device 44 can be omitted and the reliability of a connection part is improved.

Further, since a field current control device 44 constructed in the inverter unit 4 can be disposed in the vicinity of a brush holder 44 having a built-in brush 31 electrically sliding-connected through a slip ring 29 to a field winding 21 mounted in the inside of a rotor 20, the wiring structure for supplying field current can be made compact, and the reliability of the connection part can be improved.

Embodiment 5

FIG. 8 is an outer appearance view showing a structure in which an inverter unit of a vehicular rotating electrical machine apparatus of embodiment 5 of the invention is divided in a circumferential direction and is arranged, when viewed from a rear side (here, a cover is removed).

Embodiment 5 is different from embodiment 1 especially in the inverter unit structure, and portions denoted by the same reference numerals are constructed similarly to embodiment 1.

In FIG. 8, an inner peripheral surface side heat sink 401 of an inverter unit 4, an anti-rear bracket side heat sink 402, and an outer peripheral surface side heat sink 403 are respectively divided in the circumferential direction by heat conduction blocking parts 430 made of, for example, resin and are constructed such that a thermal influence is not exerted on each other by divided parts of the respective heat sinks.

In the respective heat sinks divided in the circumferential direction by the heat conduction blocking parts 430, for example, switching elements 41, diodes 42 and a capacitor 43 each having relatively large heat generation quantity and requiring sufficient cooling are mounted on a large heat sink on which many heat radiating fins are provided to stand, and a control device 44 and a field current control device 45 are mounted on a smaller heat sink, and accordingly, an electric part requiring sufficient cooling can be efficiently cooled, and further, since the heat conduction blocking parts 430 prevent the respective heat sinks from being mutually thermally influenced, there is an effect that a drop in quality and reliability due to the difference of heat resistance is prevented.

Embodiment 6

FIG. 9 is a characteristic view showing a relation between on-resistance and rated voltage of a switching element used in an inverter unit of a vehicular rotating electrical machine apparatus of embodiment 6 of the invention.

FIG. 9 shows, by comparison, the relations between the rated voltage and the on-resistance of a Si-MOSFET using Si (silicon) as composition material which is generally used for a switching element 41 in an inverter unit 4 at present and a SiC-MOSFET using SiC (silicon carbide) as composition material.

At the time of the electric operation of a vehicular rotating electrical machine or at the time of the power generation thereof, since the quantity of stored magnetic energy of an armature winding or a field winding is very large, as a countermeasure against an accident in which it is instantaneously discharged, it is necessary to set the rated voltage of the switching element 41 of the inverter unit 4 to a value several tens times larger than the battery voltage, and in the case where the rated voltage is assumed to be, for example, 250 (V), as is apparent from the comparison of the characteristics of FIG. 9, the on-resistance of the SiC-MOSFET can be reduced to a value of about $1/15$ of the on-resistance of the Si-MOSFET. Accordingly, when the SiC-MOSFET is used as the switching element, since the on-resistance is low, the heat generation quantity can also be greatly reduced, and since the heat radiating fin of a heat sink can be miniaturized, further miniaturization of the whole inverter unit including the heat sink becomes possible, and further, since resistance loss is reduced, there is an effect that the efficiency of the rotating electrical machine including the inverter is improved.

Embodiment 7

FIG. 10 is a characteristic view showing a relation between on-resistance and rated voltage of a switching element used for an inverter unit of a vehicular rotating electrical machine apparatus of embodiment 7 of the invention.

FIG. 10 shows, by comparison, the relations between the rated voltage and the on-resistance of a SiC-MOSFET described in embodiment 6 and a SiC-SIT (Static Induction Transistor) similarly using SiC composition material under certain conditions.

As is apparent from the comparison of the characteristics of FIG. 9, for example, in the case where the rated voltage is assumed to be 250 (V), the on-resistance of the SiC-SIT can be reduced to a value of several hundredth of the on-resistance of the SiC-MOSFET. Accordingly, when the SiC-SIT is used as the switching element, since the on-resistance is low, the quantity of heat generation can be greatly reduced, and the heat radiating fin of the heat sink can be miniaturized, and accordingly, further miniaturization of the whole inverter unit including the heat sink becomes possible, and further, since the resistance loss is reduced, there is an effect that the efficiency as the rotating electrical machine including the inverter is further improved.

Besides, the SiC-SIT using the SiC composition material has high withstand voltage characteristics as compared with the Si-MOSFET using Si (silicon) as composition material which is generally adopted at present, and can sufficiently withstand a high surge voltage, and accordingly, high reliability can be obtained.

Embodiment 8

FIG. 11 is an outer appearance perspective view showing a structure of a claw-pole type rotor including a permanent magnet in the vehicular rotating electrical machine apparatus according to embodiments 1 to 7 of the invention.

In FIG. 11, a rotor 20 is a claw-pole type rotor, and rotor iron cores 20A and 20B have pawl-like magnetic pole parts 20a and 20b opposite to the inner diameter of a rotor iron core 23 through a specified gap. The magnetic pole parts 20a and 20b are respectively formed to have a specified number of poles, and are alternately crossed so as to cover the outer diameter side of a field winding 21. The adjacent magnetic pole parts 20a and 20b are arranged at a constant pitch with a specified interval in the circumferential direction, and are magnetized by the field winding 21 so that the poles alternately varies. Then, permanent magnets 26 and 27 are interposed between the adjacent magnetic pole parts 20a and 20b, and the permanent magnets 26 and 27 are magnetized so that the respective magnetic pole parts 20a and 20b have the same magnetic pole as the magnetization by the field winding 21.

Since the permanent magnets 26 and 27 for supplying the magnetic flux to the armature iron core 23, together with the field winding 21, are provided, the total amount of magnetic flux is increased, and the amount of current supplied to the armature winding 24 can be reduced by making a switching control by the inverter module 40 needed to obtain the same torque characteristic, and accordingly, the quantity of heat generation in the switching element 41 is reduced, and consequently, the heat radiating fins 401a, 402a, 403a, 410a and 410b of the heat sinks 401, 402, 403 and 410 can be miniaturized, and the whole inverter unit 4 including the heat sinks 401, 402, 403 and 410 can be miniaturized, and further, since the resistance loss becomes low, the efficiency as the rotating electrical machine is improved.

Figure 1:
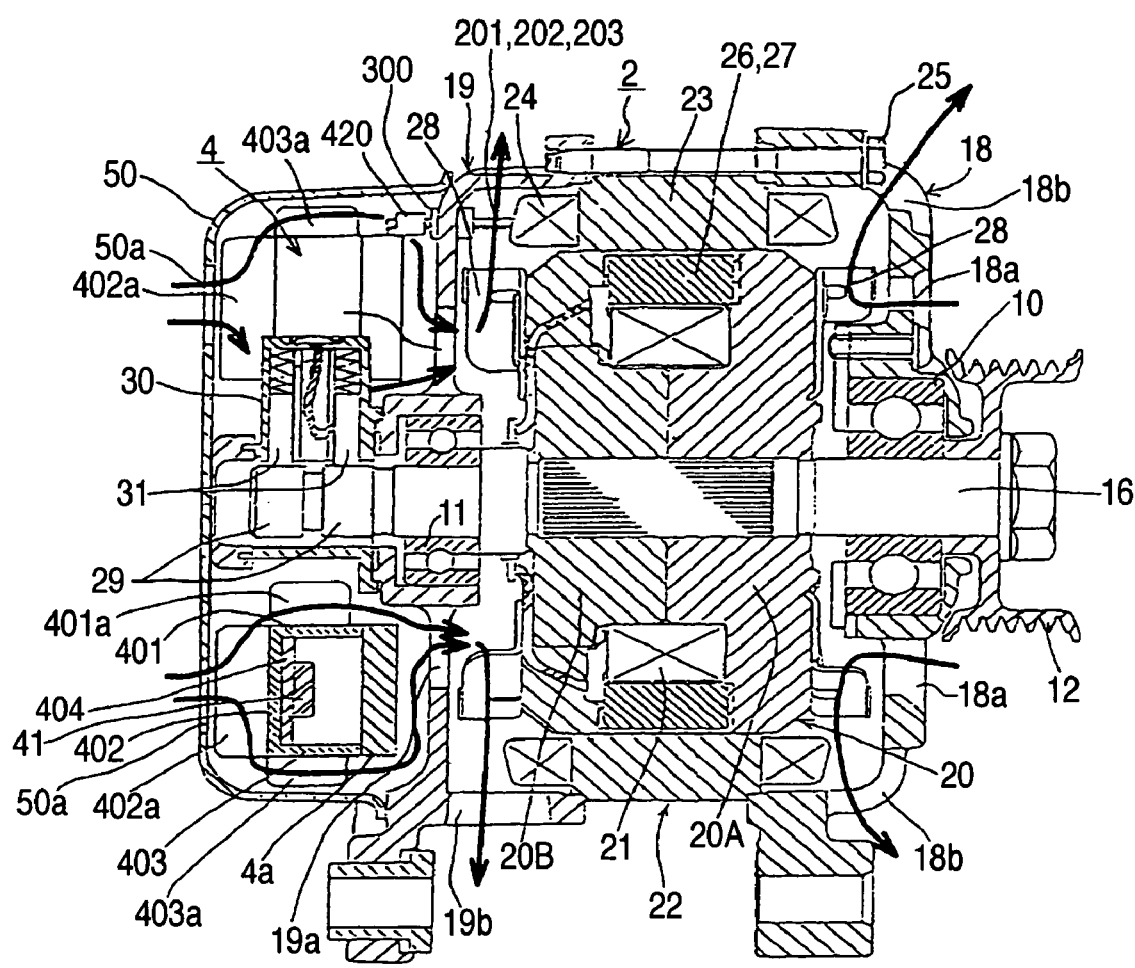
[FIG. 1] A longitudinal sectional view showing a vehicular rotating electrical machine apparatus of embodiment 1 of the invention.
Figure 2:
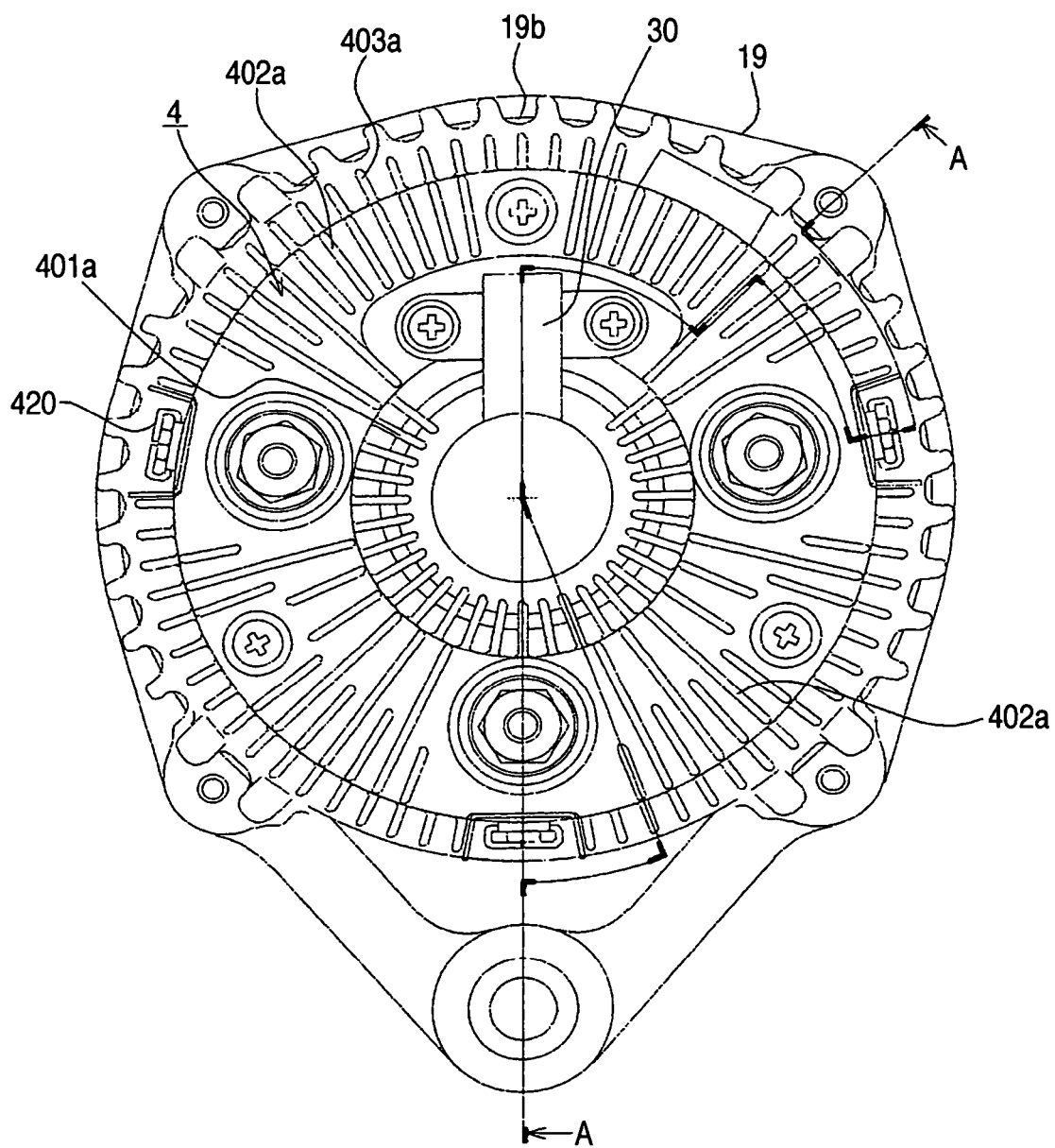
[FIG. 2] A view showing an inverter unit, when viewed from a rear side, in a case where a cover is removed in FIG. 1.
Figure 3:
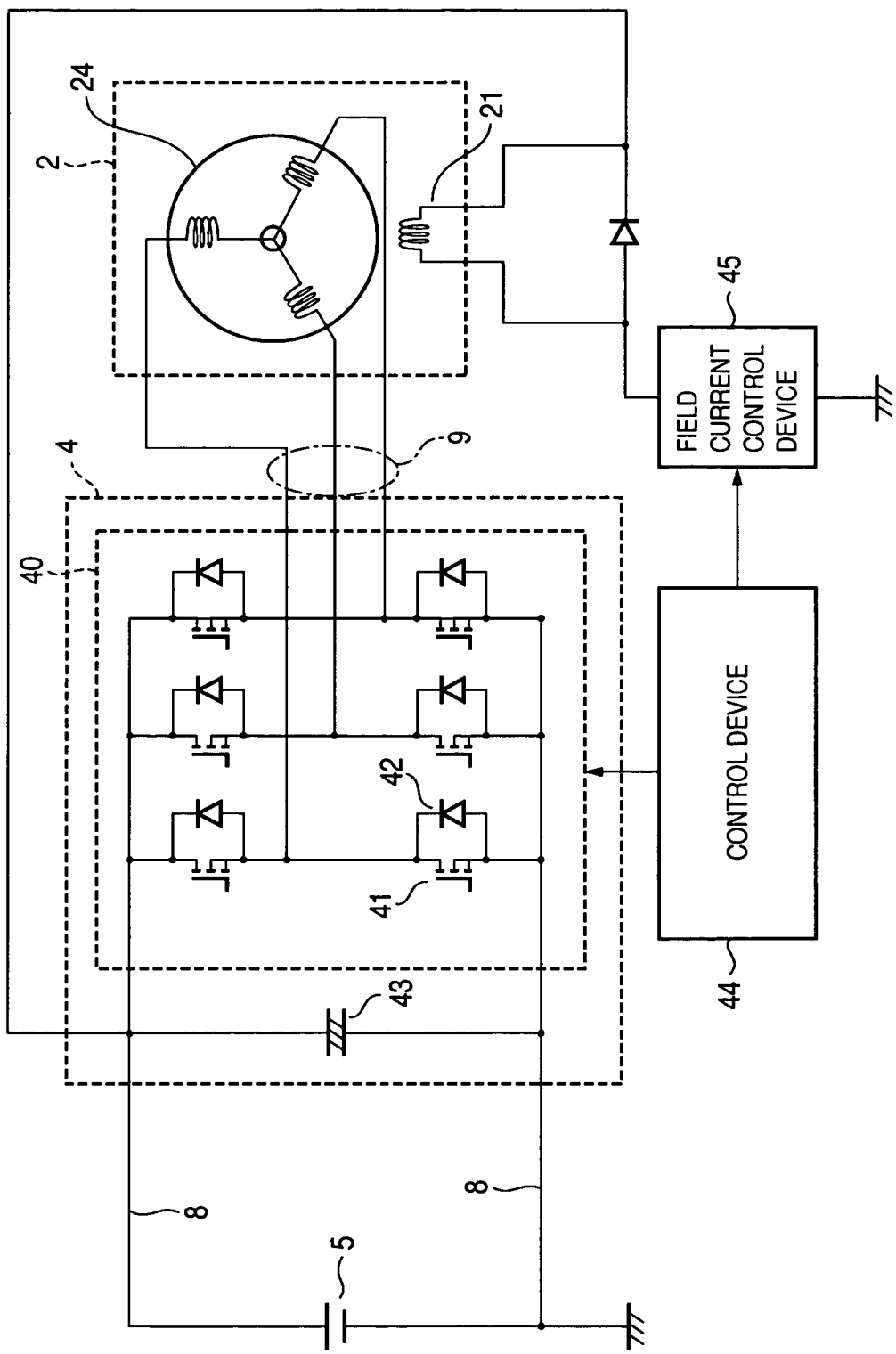
[FIG. 3] A conceptual view showing a system circuit in a hybrid electric vehicle in which the vehicular rotating electrical machine apparatus of embodiment 1 of the invention is mounted.
Figure 4:
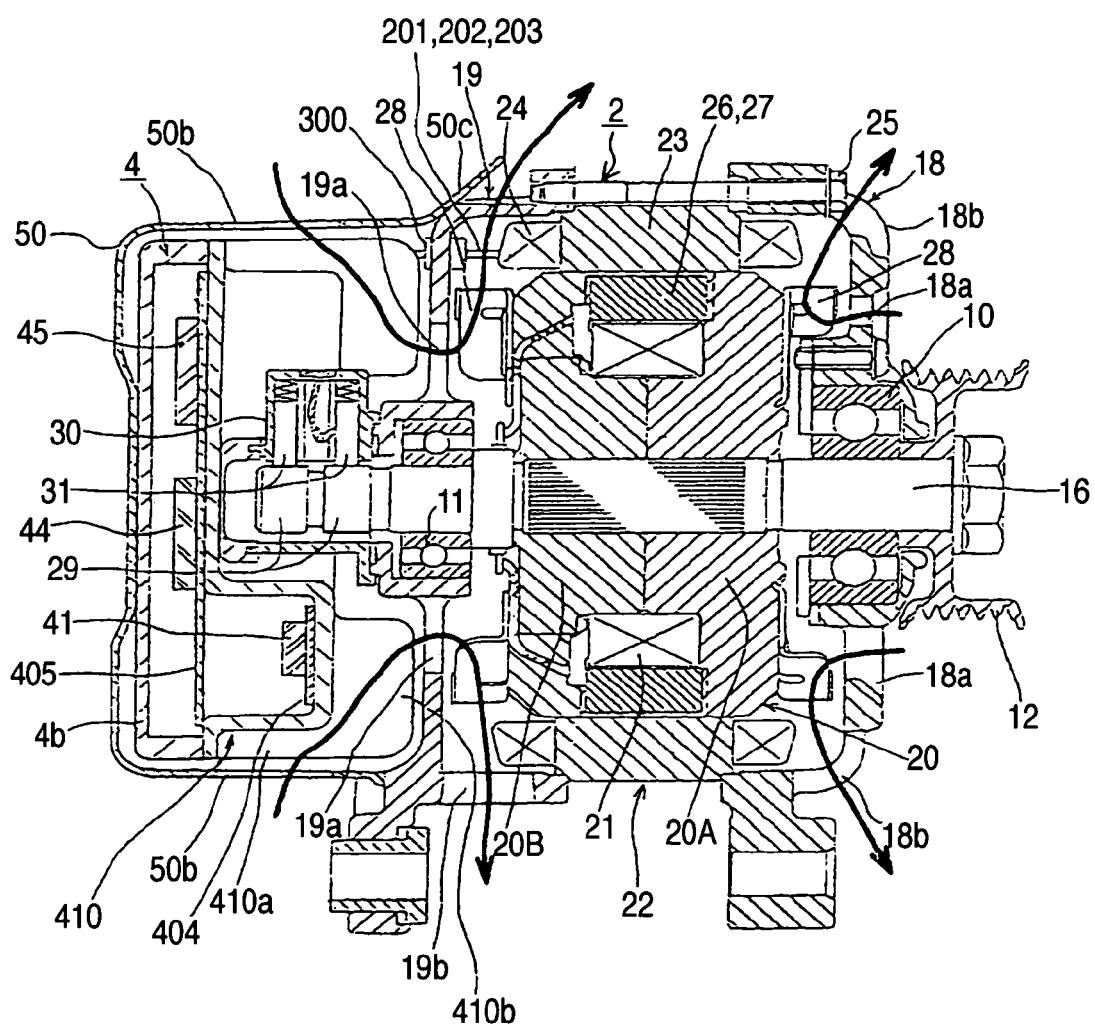
[FIG. 4] A longitudinal sectional view showing a vehicular rotating electrical machine apparatus of embodiment 2 of the invention.
Figure 5:
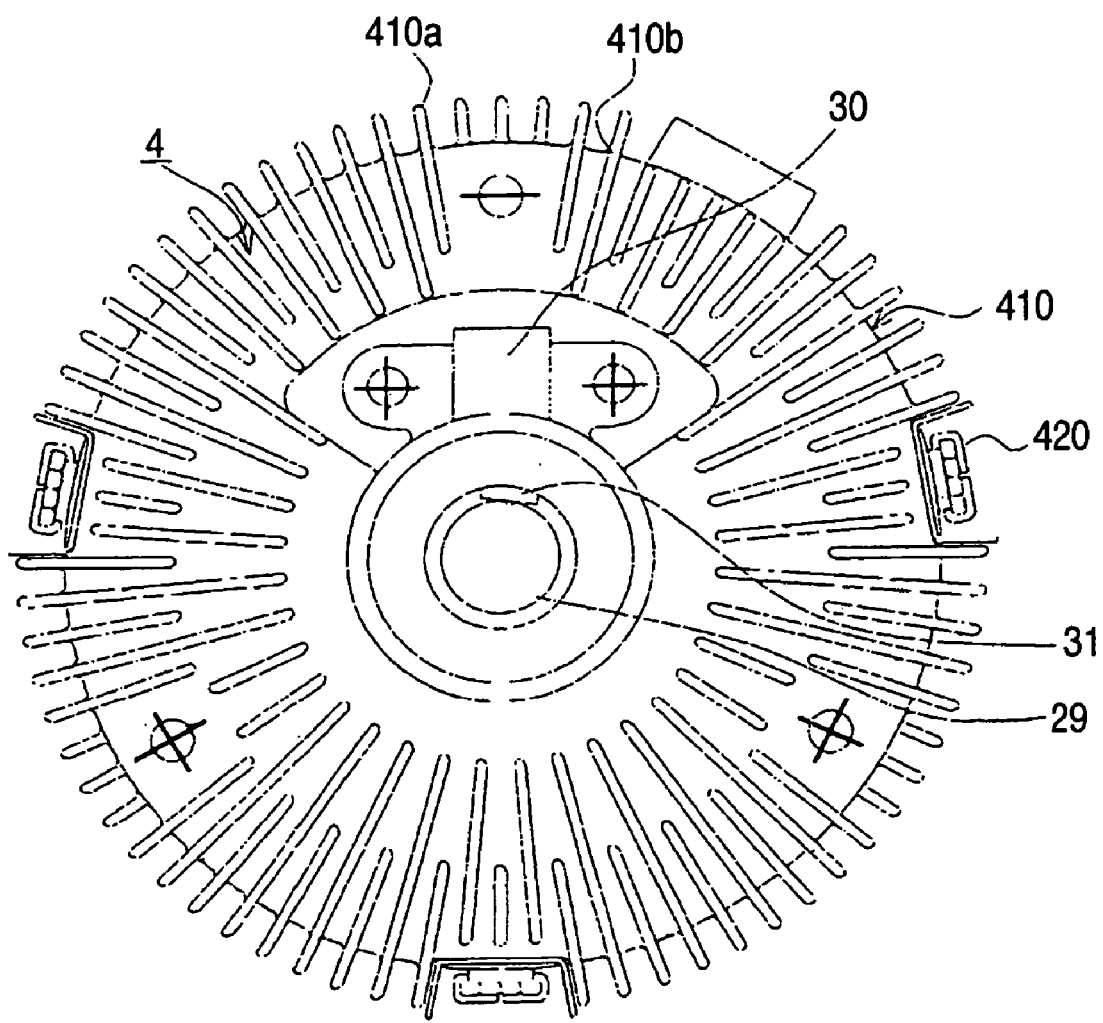
[FIG. 5] A view showing heat radiating fins of an inverter unit of the vehicular rotating electrical machine apparatus of embodiment 2 of the invention when viewed from a rear bracket side.
Figure 6:
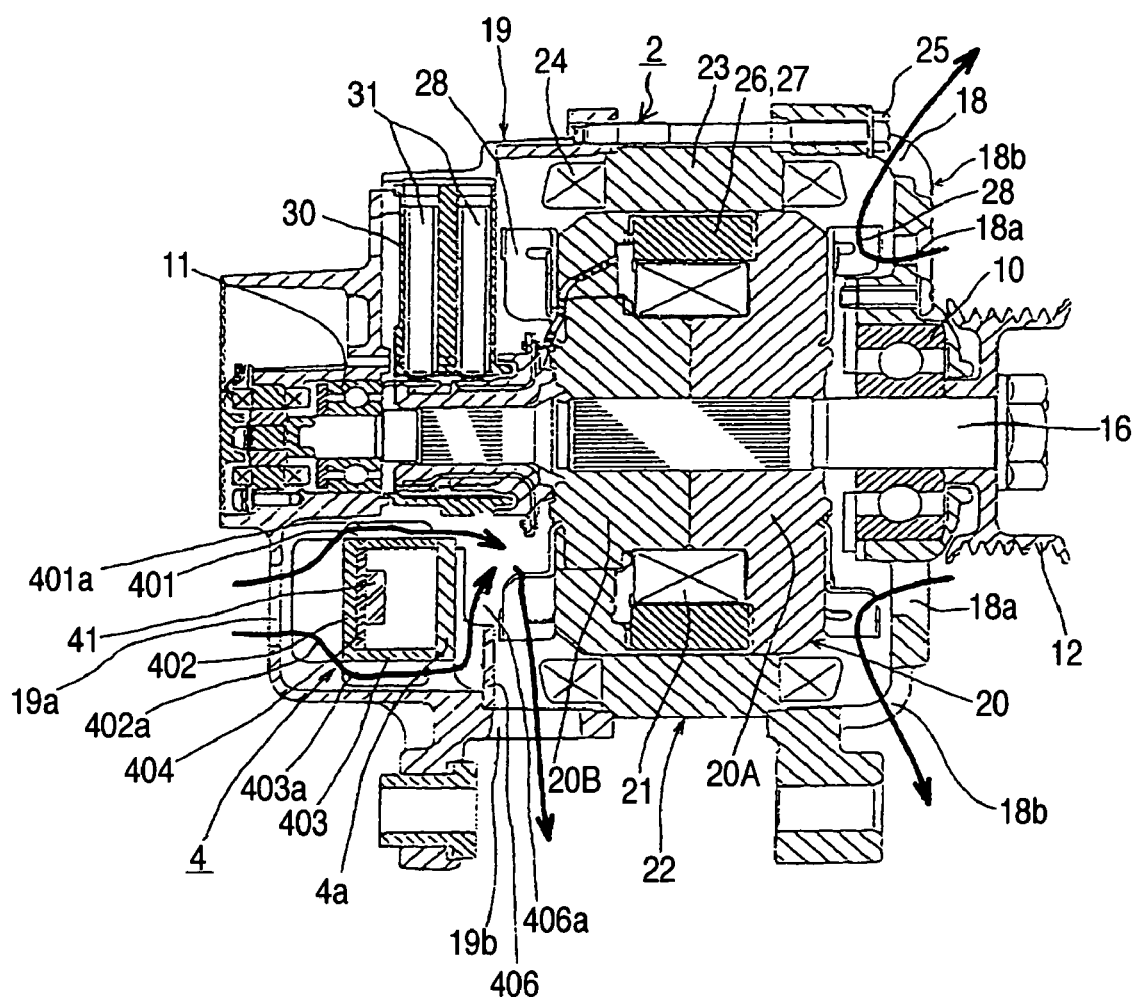
[FIG. 6] A longitudinal sectional view showing a vehicular rotating electrical machine apparatus of embodiment 3 of the invention.
Figure 7:
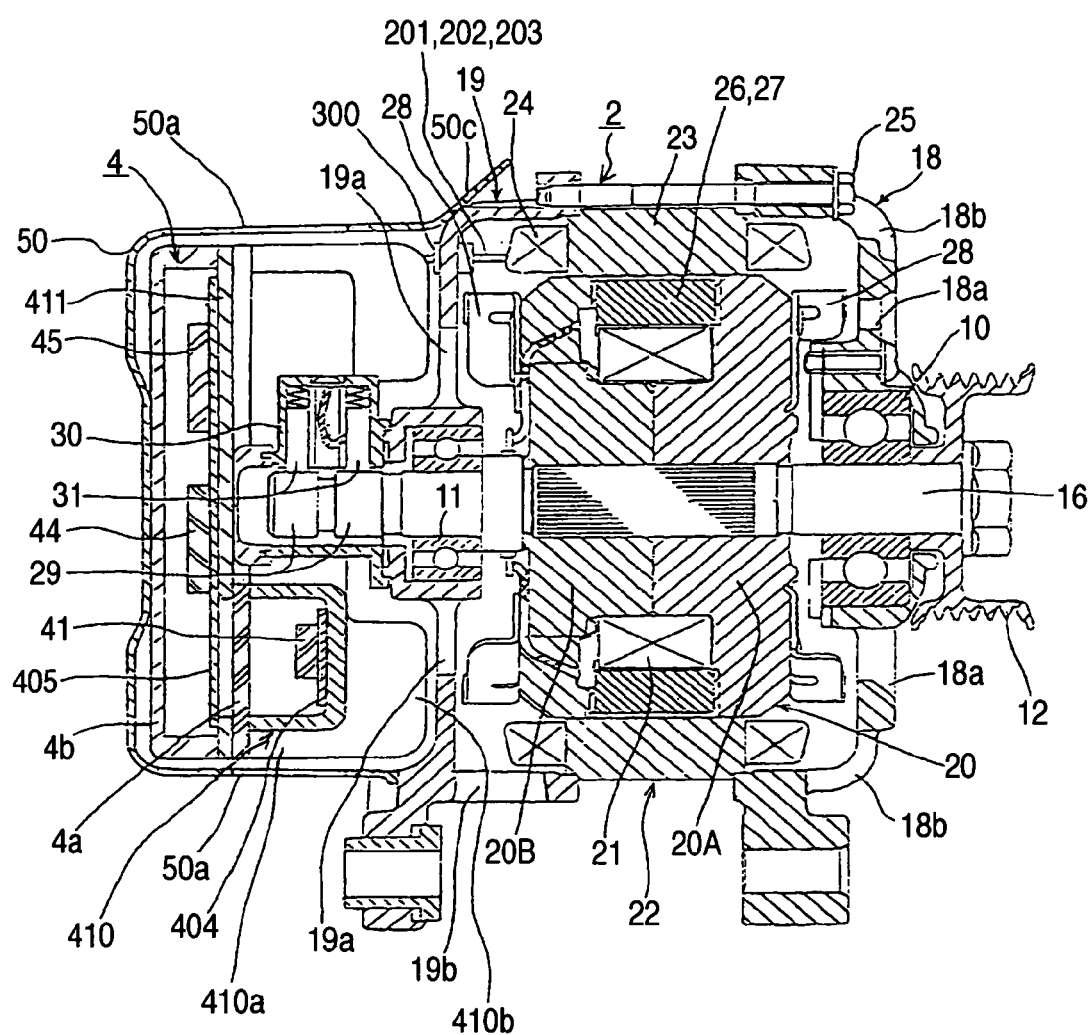
[FIG. 7] An outer appearance view showing a structure in which an inverter unit of a vehicular rotating electrical machine apparatus of embodiment 4 of the invention is arranged to be divided in an axial direction.
Figure 8:
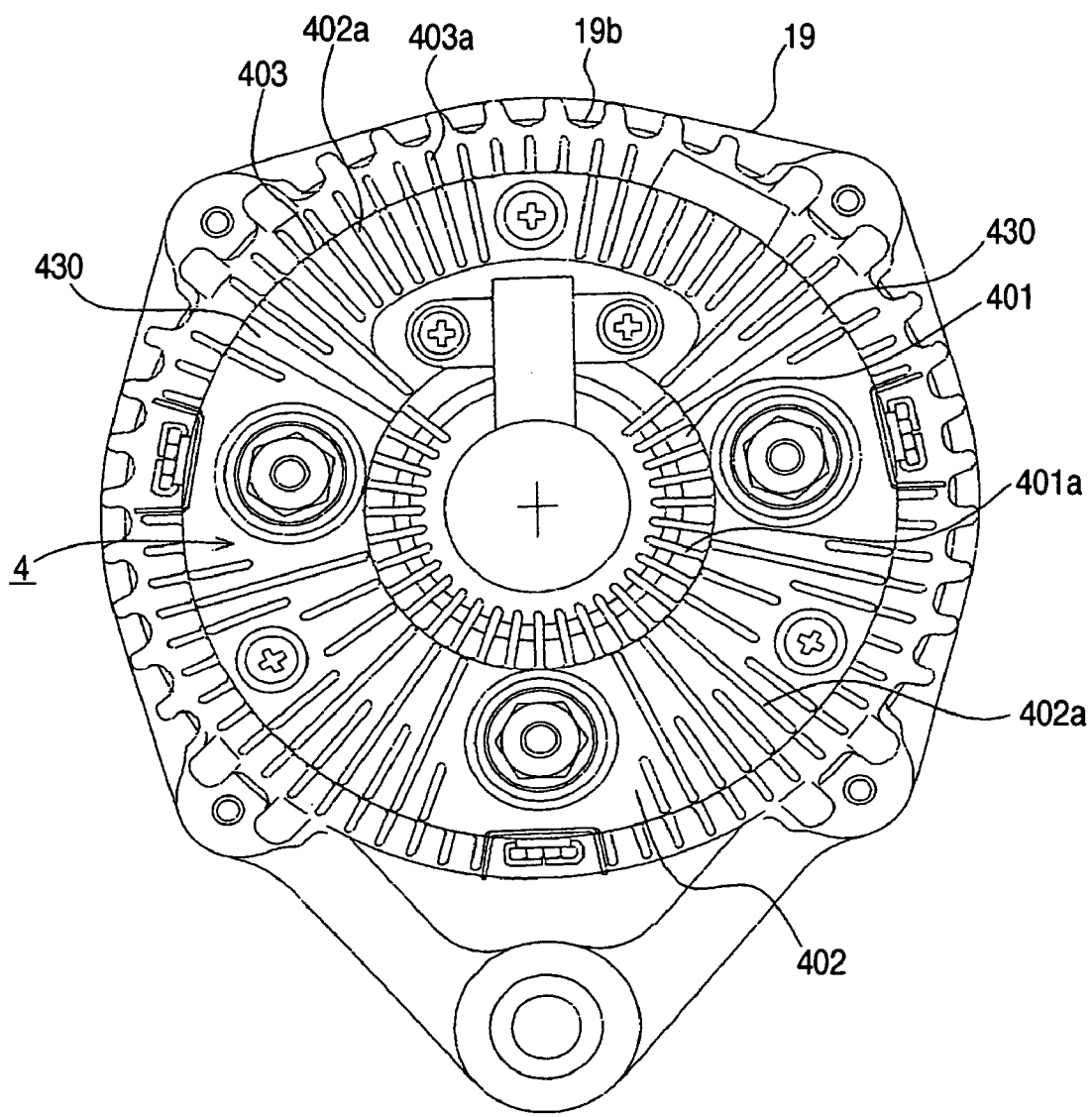
[FIG. 8] An outer appearance view showing a structure in which an inverter unit of a vehicular rotating electrical machine apparatus of embodiment 5 of the invention is arranged to be divided in a circumferential direction.
Figure 9:
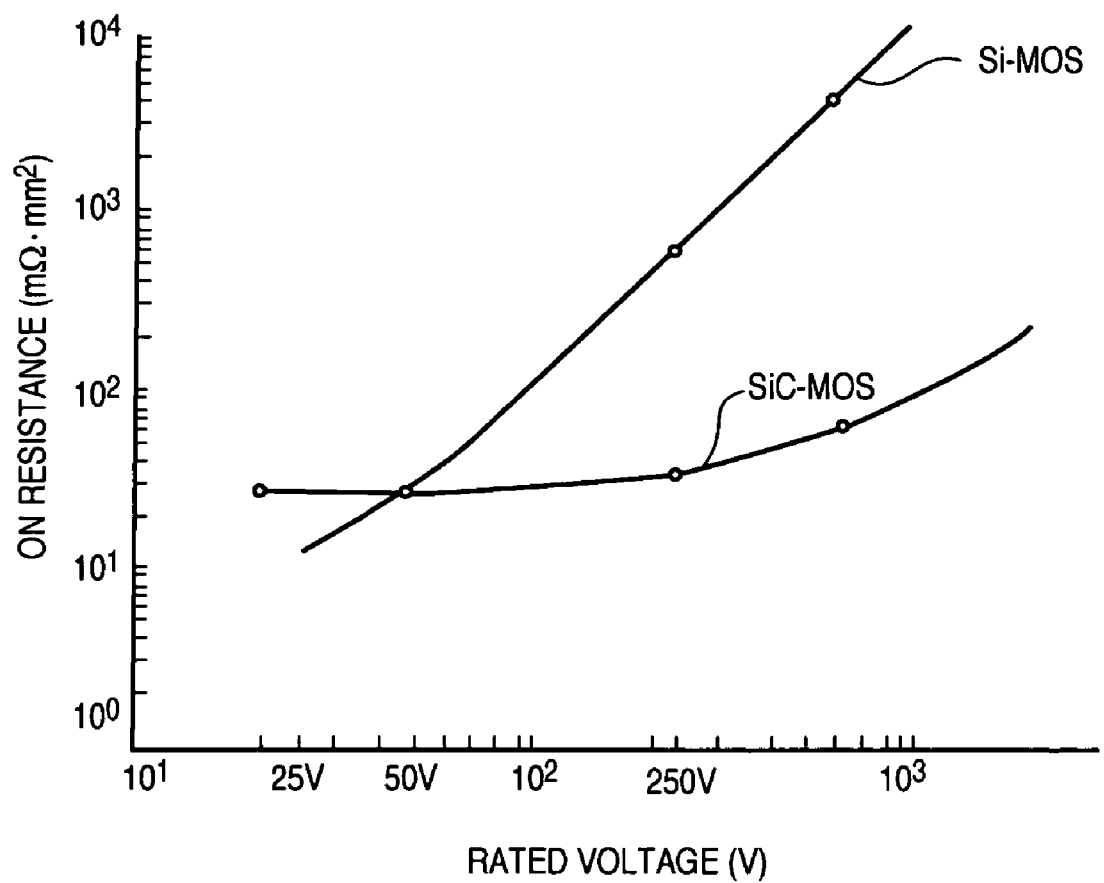
[FIG. 9] A characteristic view showing a relation between on-resistance and rated voltage of a switching element used in an inverter unit of a vehicular rotating electrical machine apparatus of embodiment 6 of the invention.
Figure 10:
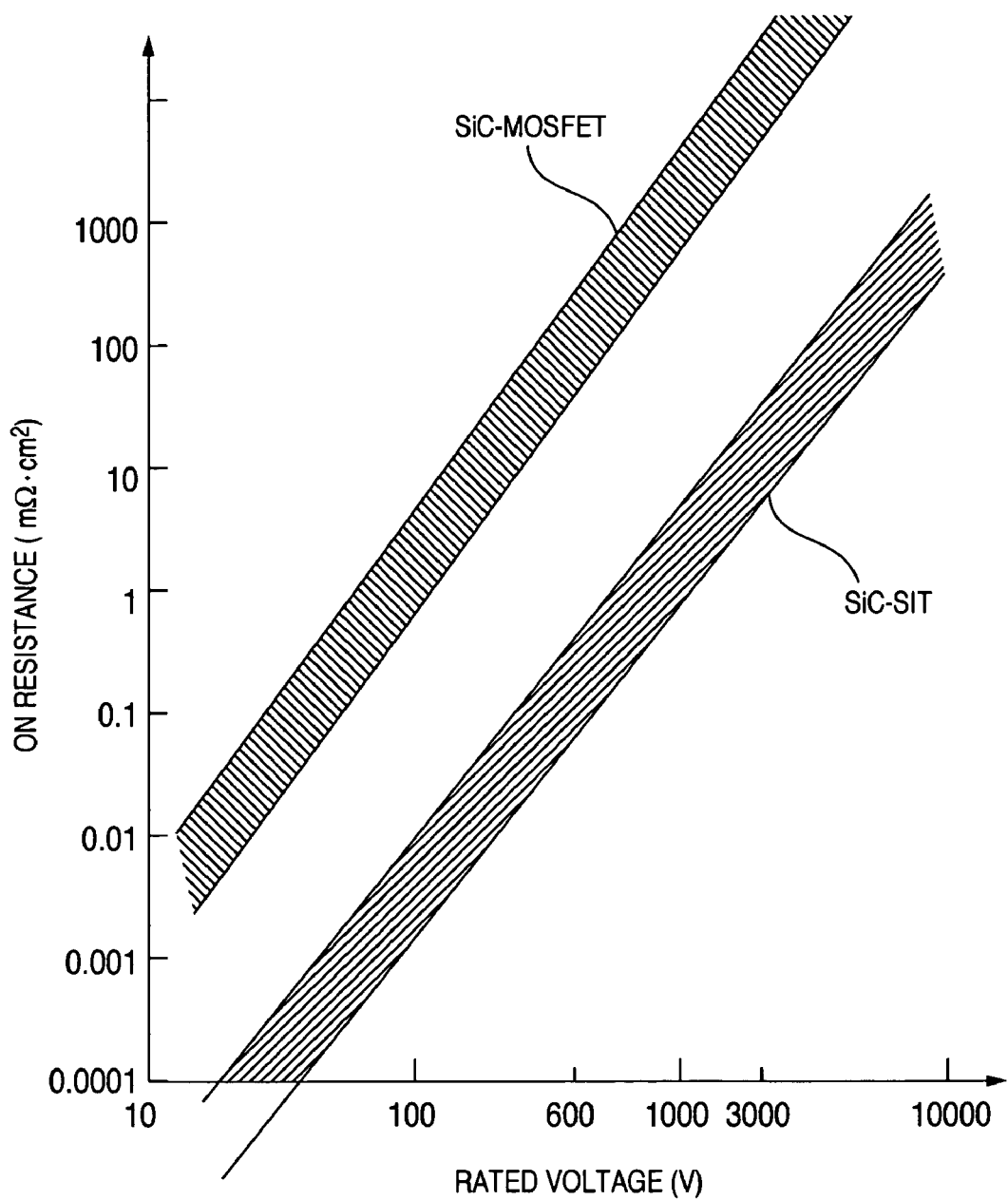
[FIG. 10] A characteristic view showing a relation between on-resistance and rated voltage of a switching element used in an inverter unit of a vehicular rotating electrical machine apparatus of embodiment 7 of the invention.
Figure 11:
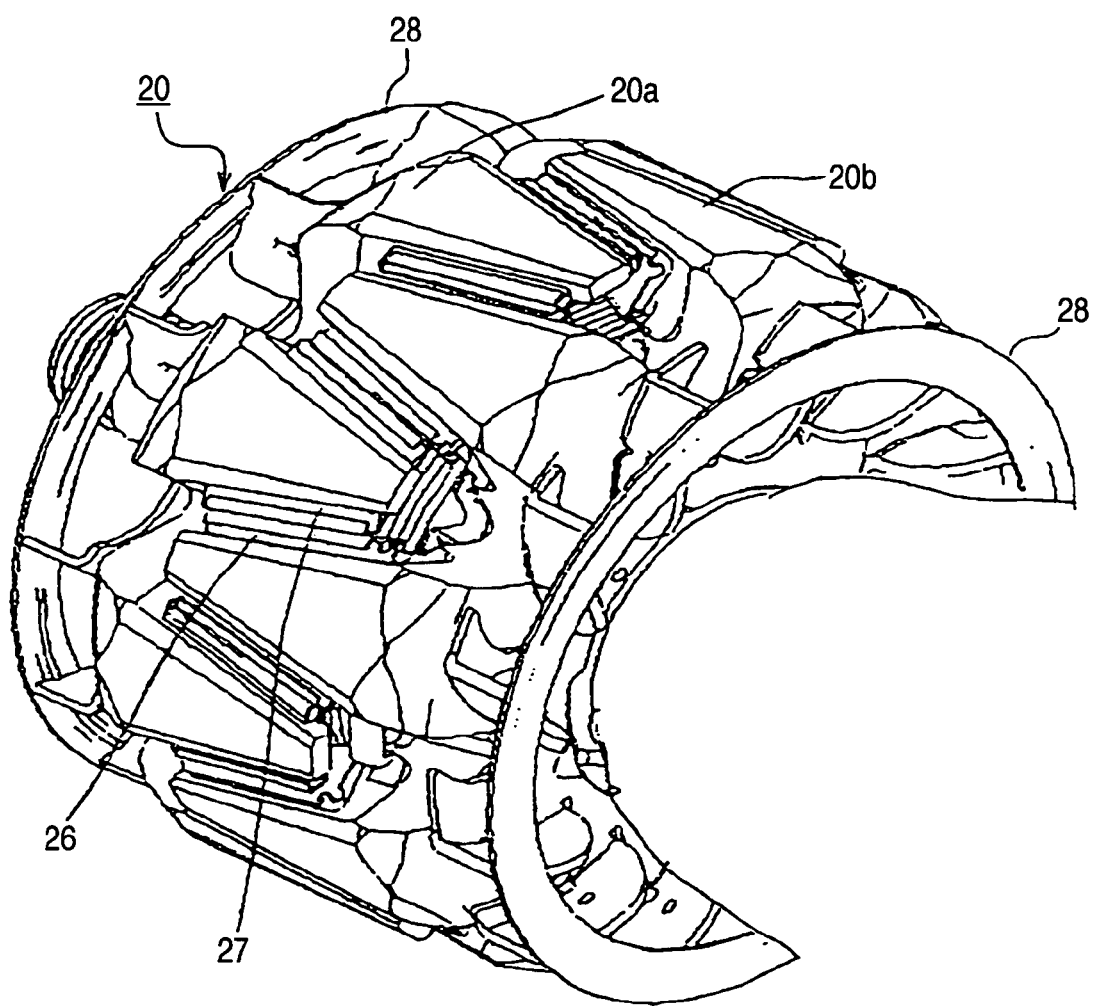
[FIG. 11] An outer appearance view of a claw-pole type rotor including a permanent magnet in the vehicular rotating electrical machine apparatus of embodiments 1 to 7 of the invention.

DESCRIPTION OF REFERENCE NUMERALS AND SIGNS 2 rotating electrical machine, 4 inverter unit, 4a circuit board, 4b case, 5 battery, 8 DC wiring, 9 AC wiring, 10 bearing, 11 bearing, 12 pulley, 16 shaft, 18 front bracket, 18a suction hole, 18b exhaust hole, 19 rear bracket, 19a suction hole, 19b exhaust hole, 20 rotor, 20A, 20B rotor iron core, 20a, 20b magnetic part, 21 field winding, 22 armature, 23 armature iron core, 24 armature winding, 25 through bolt, 26, 27 permanent magnet, 28 cooling fan, 29 slip ring, 30 brush holder, 31 brush, 40 inverter module, 41 switching element, 42 diode, 43 capacitor, 44 control device, 45 field current control device, 50 cover, 50a, 50b suction hole, 50c participation wall, 201, 202, 203 lead wire, 300 insulation bush, 401 inner peripheral surface side heat sink, 402 anti-rear bracket side heat sink, 403 outer peripheral surface side heat sink, 401a, 402a, 403a heat radiating fin, 404 circuit board, 405 circuit board, 406 partition plate, 406a ventilation hole, 410 heat sink, 410a outer peripheral surface side heat radiating fin, 410b rear bracket side heat radiating fin, 411 heat sink, 420 connection terminal part, 430 heat conduction blocking part.

The invention claimed is:

1. A vehicular rotating electrical machine apparatus comprising:

a rotating electrical machine including a shaft rotatably supported by a pair of brackets having a suction hole at an end face and an exhaust hole at an outer periphery, a rotor disposed in the pair of brackets, fixed to the shaft, having a field winding mounted to an inside, and having cooling fans mounted to both end faces, and an armature fixed to the pair of brackets at an outer periphery of the rotor to surround the rotor and including an armature iron core on which an armature winding is wound, and an inverter unit which converts DC power of a battery into AC power, supplies the AC power to the armature winding and causes the rotor to generate rotating power, or converts AC power generated in the armature winding into DC power and charges the battery, the inverter unit including an inverter module having plural switching elements and at least a field current control device for controlling the field current or a control device for controlling switching operations of the plural switching elements, wherein the inverter unit has a substantially hollow cylindrical shape or hollow polygonal prism shape and a heat sink constructed with plural heat radiating fins formed of metal material in at least one part of an inner peripheral surface or an anti-bracket side end face or an outer peripheral surface, the inverter module and at least the field current control device or the control device are mounted on the heat sink and a thermal conduction blocking portion is provided such that part of the heat sink on which the inverter module is mounted and the part of the heat sink on which the field current control device or the control device is mounted are not thermally influenced by each other, covered by a cover fixed to either one of the outer end faces of the paired brackets integrally and having a suction hole in the end face in an axis direction thereof, and disposed to cause cooling air sucked through the suction hole of the cover in the axial direction by the cooling fan to cool the heat radiating fins before cooling of the rotating electrical machine.

2. A vehicular rotating electrical machine apparatus comprising:

a rotating electrical machine including a shaft rotatably supported by a pair of brackets having a suction hole at an end face and an exhaust hole at an outer periphery, a rotor disposed in the pair of brackets, fixed to the shaft, having a field winding mounted to an inside, and having cooling fans mounted to both end faces, and an armature fixed to the pair of brackets at an outer periphery of the rotor to surround the rotor and including an armature iron core on which an armature winding is wound, and an inverter unit which converts DC power of a battery into AC power, supplies the AC power to the armature winding and causes the rotor to generate rotating power, or converts AC power generated in the armature winding into DC power and charges the battery, the inverter unit including an inverter module having plural switching elements and at least a field current control device for controlling the field current or a control device for controlling switching operations of the plural switching elements, wherein the inverter unit has a substantially hollow cylindrical shape or hollow polygonal prism shape and a heat sink constructed with plural heat radiating fins formed of metal material in at least one part of a bracket side end face and an outer peripheral surface, the inverter module and at least the field current control device or the control device are mounted on the heat sink and a thermal conduction blocking portion is provided such that part of the heat sink on which the inverter module is mounted and the part of the heat sink on which the field current control device or the control device is mounted are not thermally influenced by each other, covered by a cover fixed to either one of the outer end faces of the paired brackets integrally and having plural suction holes on the outer peripheral surface, and disposed to cause cooling air sucked through the suction hole in the outer peripheral surface of the cover by the cooling fan to cool the heat radiating fins before cooling of the rotating electrical machine.

3. The vehicular rotating electrical machine apparatus according to claim 1, characterized in that part of or all of the heat radiating fins are radially disposed substantially toward a center direction.

4. The vehicular rotating electrical machine apparatus according to claim 1, characterized in that part of or all of the heat radiating fins are disposed substantially in parallel to the shaft and to expand radially from a center direction.

5. The vehicular rotating electrical machine apparatus according to claim 1, characterized in that a partition wall or an air-guide wall to control an exhaust direction is provided to the cover or the bracket to which the inverter unit is fixed, so that high temperature exhaust cooling air exhausted from the exhaust hole provided in the outer periphery of the bracket is not circulated to and sucked through the suction hole of the cover.

6. The vehicular rotating electrical machine apparatus according to claim 1, characterized in that raw material of the cover is metal.

7. A vehicular rotating electrical machine apparatus comprising:

a rotating electrical machine including a shaft rotatably supported by a pair of brackets having at least one suction hole at an end face and an exhaust hole at an outer periphery, a rotor disposed in the pair of brackets, fixed to the shaft, having a field winding mounted to an inside, and having cooling fans mounted to both end faces, and an armature fixed to the pair of brackets at an outer periphery of the rotor to surround the rotor and including an armature iron core on which an armature winding is wound, and an inverter unit which converts DC power of a battery into AC power, supplies the AC power to the armature winding and causes the rotor to generate rotating power, or converts AC power generated in the armature winding into DC power and charges the battery, the inverter unit including an inverter module having plural switching elements and at least a field current control device for controlling the field current or a control device for controlling switching operations of the plural switching elements, wherein the inverter unit has a substantially hollow cylindrical shape or hollow polygonal prism shape and a heat sink constructed with plural heat radiating fins formed of metal material in at least one part of an inner peripheral surface or an a bracket side end face or an outer peripheral surface, the inverter module and at least the field current control device or the control device are mounted on the heat sink and a thermal conduction blocking portion is provided such that part of the heat sink on which the inverter module is mounted and the part of the heat sink on which the field current control device or the control device is mounted are not thermally influenced by each other, fixed to either one of the inner end faces of the paired brackets integrally and partitioned by a substantially donut-shaped partition plate integrally fixed to either one of the inner side end faces of the paired brackets and having a through hole opened at a center between the rotor and the armature; and disposed to cause cooling air sucked through the at least one suction hole in the end face of the brackets by the cooling fan to cool the heat radiating fins before cooling of the rotating electrical machine.

8. The vehicular rotating electrical machine apparatus according to claim 6, characterized in that the partition plate is integrally fixed to the inverter unit.

9. The vehicular rotating electrical machine apparatus according to claim 1, characterized in that the switching elements includes SiC-MOSFETs using SiC composition material.

10. The vehicular rotating electrical machine apparatus according to claim 1, characterized in that the switching elements include SiC-SITs using SiC composition material.

11. The vehicular rotating electrical machine apparatus according to claim 1, characterized in that the rotor includes a rotor iron core including a magnetic pole part formed into a claw-pole type in which adjacent magnetic poles are different from each other and a cylindrical part having the field winding, and a permanent magnet which is provided in a magnetic circuit of the rotor iron core and supplies, together with the field winding, a magnetic flux to the armature iron core.

* * * * *